US012650587B2

(12) United States Patent
Dietrich et al.

(10) Patent No.: US 12,650,587 B2
(45) Date of Patent: Jun. 9, 2026

(54) OBJECTIVE ATTACHMENT FOR A MICROSCOPE OBJECTIVE AND APPARATUS FOR FEEDING AND/OR REMOVING AN IMMERSION LIQUID

(71) Applicant: Carl Zeiss Microscopy GmbH, Jena (DE)

(72) Inventors: Christian Dietrich, Jena (DE); Jens Hofmann, Jena (DE); Daniel Ewert, Aalen-Ebnat (DE)

(73) Assignee: Carl Zeiss Microscopy GmbH, Jena (DE)

( * ) Notice: Subject to any disclaimer, the term of this patent is extended or adjusted under 35 U.S.C. 154(b) by 287 days.

(21) Appl. No.: 18/207,958

(22) Filed: Jun. 9, 2023

(65) Prior Publication Data
US 2023/0400678 A1 Dec. 14, 2023

(30) Foreign Application Priority Data
Jun. 13, 2022 (DE) ..................... 10 2022 114 862.9

(51) Int. Cl.
*G02B 21/33* (2006.01)
*G02B 21/02* (2006.01)

(52) U.S. Cl.
CPC ............. *G02B 21/33* (2013.01); *G02B 21/02* (2013.01)

(58) Field of Classification Search
CPC .... G02B 21/02; G02B 21/33; G02B 21/0028; G02B 21/245; G02B 21/362; G02B 15/10; G02B 15/12; G02B 7/00; G02B 27/62
See application file for complete search history.

(56) References Cited

U.S. PATENT DOCUMENTS 8,692,973 B2 * 4/2014 Nagasaka ........... G03F 7/70341
355/72
10,725,277 B2 * 7/2020 Nakamura ............. G02B 21/33
(Continued)

FOREIGN PATENT DOCUMENTS

DE 10333326 A1 3/2005
DE 102006042088 A1 3/2008
(Continued)

OTHER PUBLICATIONS

Search Report for German Application No. 10 2022 114 862.6 (English translation not available), mailed Feb. 15, 2023, 6 pages.

*Primary Examiner* — Mustak Choudhury
(74) *Attorney, Agent, or Firm* — LaBatt, LLC

(57) ABSTRACT

An objective attachment for a microscope objective for transporting an immersion liquid between a target region on a front side of the microscope objective and a line, comprising at least one cannula having a spout for dispensing and/or receiving the immersion liquid and having a distal opening, to which the line for the immersion liquid can be connected, and comprising a fastening device for holding the cannula on a housing of the microscope objective and for positioning the spout relative to the target region is described. The fastening device comprises at least two arms, which are configured to at least partially laterally engage around the housing of the microscope objective and to hold on the housing in a force-fitting manner. An apparatus for feeding immersion liquid to a target region on a front region of a microscope objective and/or for removing immersion liquid from the target region also is described.

35 Claims, 4 Drawing Sheets

(56) References Cited

U.S. PATENT DOCUMENTS

| | | | | |
|---|---|---|---|---|
| 10,859,807 B2 * | 12/2020 | Shimada | ................ | G02B 21/33 |
| 2005/0094293 A1 * | 5/2005 | Tanabe | .................... | G02B 7/14 |
| | | | | 359/811 |
| 2007/0291360 A1 | 12/2007 | Pirsch | | |
| 2008/0259446 A1 * | 10/2008 | Komatsu | ................ | G02B 21/33 |
| | | | | 359/391 |
| 2010/0027109 A1 | 2/2010 | Liebel et al. | | |
| 2021/0341723 A1 * | 11/2021 | Knoblich | ............. | G02B 21/248 |

FOREIGN PATENT DOCUMENTS

| | | | | |
|---|---|---|---|---|
| JP | 2005028385 A | * | 2/2005 | |
| WO | 2020163326 A1 | | 8/2020 | |

\* cited by examiner

OBJECTIVE ATTACHMENT FOR A MICROSCOPE OBJECTIVE AND APPARATUS FOR FEEDING AND/OR REMOVING AN IMMERSION LIQUID

REFERENCE TO RELATED APPLICATIONS

The current application claims the benefit of German Patent Application No. 10 2022 114 862.9, filed on 13 Jun. 2023, which is hereby incorporated by reference.

FIELD OF THE DISCLOSURE

In a first aspect, the invention relates to an objective attachment for a microscope objective. In a further aspect, the invention relates to an apparatus for feeding and/or removing immersion liquid.

BACKGROUND

An objective attachment of the type in question for a microscope objective serves to transport an immersion liquid between a target region on a front side of the microscope objective and a line and comprises at least one cannula having a spout for dispensing and/or receiving the immersion liquid and having a distal opening, to which the line for the immersion liquid can be connected. Also present is a fastening device for holding the cannula on a housing of the microscope objective and for positioning the spout relative to the target region.

In microscopy, it is known to arrange a medium having a higher refractive index than air between the microscope objective and a sample to be investigated. This increases the numerical aperture for the imaging and consequently enhances the resolution. On account of the media used for this, which can be referred to as immersion media, such microscope objectives are also referred to as immersion objectives. Typical immersion media are, for example, water, glycerol or certain oils.

For the purposes of the present application, the immersion media are referred to as immersion liquids.

In the event of applying, in particular manually applying, these immersion liquids, the following objects and problems exist:

For inverted stands, that is to say stands in the case of which the microscope objective faces upwards, the sample must be removed or at least displaced to obtain access to the front lens of the microscope objective. This can entail the risk of again losing a target location which has been found in the sample by means of an overview objective during a work procedure and has been selected for investigation.

In the case of microscopes with an overbuilt incubation unit, frequently the microscope objective as such is scarcely visible, which makes it more difficult to apply or introduce an immersion liquid. In the case of what are referred to as "boxed systems", in addition it is not possible to provide access for the end user in the first place.

Generally, in addition, experience is required in order to apply the immersion liquid to the target location on the microscope objective without bubbles. Lastly, care must be taken to apply or introduce the correct immersion liquid.

A series of autoimmersion modules which are used in particular for automated microscopes are commercially available. Manufacturers are, for example, Zeiss, Leica, Molecular Probes, Märzhäuser and Nikon. The respective applications have sometimes significant structural extensions and considerable expert knowledge is required to install them. As a result of the installation size and the installation space respectively taken up, sometimes considerable restrictions can moreover arise in terms of the function of the respective microscopes; for example, the free working distance from or ability to access the sample can be reduced.

Objective attachments of the type in question are described, for example, in WO2020163326A1 and DE102006042088A1.

The objective attachments disclosed in these documents are slipped over the microscope objective substantially from the front side and it is therefore comparatively complex to remove or install the objective attachment in the case of these solutions. For that, the microscope objective must be moved relatively far away from the sample to be investigated. Moreover, a comparatively large installation space is necessary for the objective attachments disclosed in those documents.

SUMMARY

It can be considered an object of the invention to provide an objective attachment for a microscope objective which is particularly straightforward to apply and remove and which takes up as little as possible installation space upstream of the microscope objective. Moreover, the intention is to provide an apparatus for feeding and/or removing immersion liquid.

This object is achieved by the objective attachment having the features of Claim 1 and by the apparatus having the features of Claim 28.

The objective attachment of the type specified above is developed according to the invention in that the fastening device comprises at least two arms, which are configured to at least partially laterally engage around the housing of the microscope objective and to hold on the housing in a force-fitting manner.

The apparatus according to the invention for feeding immersion liquid to a target region on a front region of a microscope objective and/or for removing immersion liquid from the target region comprises at least one objective attachment according to the invention. Then, at least one storage container for the immersion liquid is present, as is a line which connects the storage container to the distal opening of the cannula of the objective attachment. Lastly, a pump for pumping the immersion liquid in the line is present.

Preferred exemplary embodiments of the objective attachment according to the invention and advantageous variants of the apparatus according to the invention are explained below, in particular in connection with the dependent claims and the figures.

The term "objective attachment" means that it is a structural unit configured to be mounted on a microscope objective.

The objective attachment serves to transport an immersion liquid towards the target region on the front side of the microscope objective and to transport the immersion liquid away out of the target region. The target region denotes that region which adjoins a front lens of the microscope objective and which must contain the immersion liquid in order that the numerical aperture is increased as intended in a manner corresponding to the refractive index of the immersion liquid.

The line denotes that transport line through which the immersion liquid is conducted to or removed from the objective attachment. The term "cannula" denotes a thin line. A spout denotes that outlet of the cannula that is located close to the target region in the working state. The distal opening of the cannula is the other opening of the cannula, to which the line for the immersion liquid can be connected.

An essential idea of the present invention can be considered that of the fastening device being configured to at least partially engage around a housing of a microscope objective from the side and to retain it there in a force-fitting manner.

The fastening device serves to hold at least the spout in a working position relative to the target region on the microscope objective.

This achieves the advantage that the objective attachment according to the invention can be mounted on the microscope objective substantially without adversely affecting the relative position of the sample and the microscope objective.

In principle, for the implementation of the present invention it is sufficient if the objective attachment comprises only a single cannula, for example for the defined application or introduction of the immersion liquid. A preferred variant of the objective attachment according to the invention, however, is distinguished in that a first cannula is present which has a first spout for dispensing the immersion liquid into the target region and has a first distal end, to which a first line for the immersion liquid can be connected, and in that a second cannula is present which has a second spout for receiving the immersion liquid from the target region and has a second distal end, to which a second line for the immersion liquid can be connected. The immersion liquid can thus be introduced in a defined manner and also removed again in a defined manner.

In the case of corresponding exemplary embodiments of the apparatus according to the invention, the objective attachment correspondingly comprises a first cannula for feeding the immersion liquid and a second cannula for removing the immersion liquid, the storage container is connected to the first cannula by way of a first line, and a disposal container connected to the second cannula by way of a second line is present.

A respective flow sensor may be present in the first and/or the second line in order to determine the respectively transported quantities of immersion liquid.

If the rates at which immersion liquid is lost from the target region are known, a point in time at which immersion liquid must be supplied can be determined. In that case, a defined quantity of immersion liquid can be subsequently delivered using the flow sensor in the feed line.

To work with different immersion liquids, in the case of the apparatus according to the invention it is possible for multiple storage containers and/or multiple disposal containers for different immersion liquids to be present.

To rinse the lines and/or the cannulas, preferably a reservoir for a rinsing medium, for example water, may be present.

The first cannula and the second cannula may preferably be structurally identical.

In order to introduce and/or remove an immersion liquid into and/or from the target region on a microscope objective from multiple directions, for example from different radial directions, it can be advantageous if multiple pairs of a first cannula and a second cannula for respectively feeding and removing immersion liquid are present. The pairs of a first cannula and a second cannula may, however, also be used to introduce and/or remove two or more different immersion liquids sequentially into and/or from the target region on a microscope objective for different measurements.

In the case of particularly preferred exemplary embodiments of the objective attachment according to the invention, the shape of the spout or the respective shapes of the spouts can be adapted to the target region such that the immersion liquid can be introduced into the target region or removed from the target region in a particularly targeted manner. For example, the opening of a spout or of multiple or all spouts in cross section may have the shape of a flat rectangle, in particular with rounded edges, or the shape of a flat ellipse.

An axis which coincides with the optical axis of the microscope objective in the installed state or working state of the objective attachment on a microscope objective can be defined in the objective attachment, in particular in the fastening device. The installed state or working state of the objective attachment is that state in which the attachment is mounted on a microscope objective as intended.

In order that an immersion liquid can be dispensed into the target region or received from the target region in the form of a flat strand, as it were, it is preferred when a long side of the rectangle or the direction of the semi-major axis of the ellipse is oriented transversely in relation to the thus defined axis of the objective attachment.

In order to have the effect that the objective attachment according to the invention in the installed state or working state projects to a particularly small extent beyond the microscope objective in the direction of its optical axis, it is moreover preferred if an outer contour of one spout, multiple spouts or all spouts has a flattening.

The fastening device and the flattening of the spouts are in this respect advantageously configured such that a plane defined by the flattening is oriented transversely in relation to the axis of the objective attachment as defined above. This means that the flat side of a spout in the working state is oriented substantially parallel to the front side of the microscope objective and optionally touches it or rests right up against the front side of the microscope objective.

Further improvements for introducing and/or removing an immersion liquid can be achieved if not only the cross section of the spout, but also a contour of the opening of the spout, is adapted to the target region. For example, it is advantageous if the opening of one spout or of multiple or all spouts at least partially engages around the target region. What is meant by this is that the shape of the opening of the spout is formed such that the spout, as seen from the direction of the axis of the objective attachment, on the side of the opening has a concave region, for example having a contour in the form of a segment of a circle, which engages around the target region.

Further improvements for introducing and/or removing an immersion liquid are possible when at least parts of the surface of at least one of the spouts or of multiple or all spouts have an attractive or repulsive surface functionalization with regard to certain types of immersion liquids. In this respect, regions along which the immersion liquid is to be transported or which as intended are to come into contact with the immersion liquid or which the immersion liquid is to wet may be provided with an attractive surface functionalization. Other regions, which the immersion liquid as intended is not to wet, can correspondingly be provided with a repulsive surface functionalization.

These regions are preferably respectively configured such that an outflowing of immersion liquid from the side of the spouts is avoided as far as possible.

Depending on the type of immersion liquid used, the surface functionalization can advantageously confer hydrophobic, hydrophilic, lipophilic or lipophobic properties on the respective parts of the surface.

The surface functionalizations can in principle be obtained in different ways. For example, parts of the surface of the spout or of the spouts that have a surface functionalization may have a microstructuring, a coating and/or chemically treated surface regions and/or be made from a material with a desired surface functionalization.

It is also possible for the cannula in the region of the spout to be manufactured from different materials.

In order to have the effect that the cannulas and the spouts in the working state project to a particularly small extent beyond the microscope objective, it is preferred if an end piece of the first cannula that connects to the first spout and an end piece of the second cannula that connects to the second spout are arranged on the lateral surface of a cone, the axis of which coincides with the axis of the objective attachment.

A further preferred configuration of the objective attachment according to the invention is distinguished in that an end piece of the first cannula that connects to the first spout and an end piece of the second cannula that connects to the second spout are arranged with an opening angle of less than 180°, preferably less than 90° and particularly preferably less than 45° in relation to the axis of the objective attachment in an angular segment of an azimuth angle. The azimuth angle in this respect is the angle encircling the axis of the objective attachment. Such an arrangement has advantages both in terms of the ease of handling of the objective attachment according to the invention and in terms of the actual aim, specifically the reliable application and extraction by suction of an immersion liquid to and from the target region upstream of the microscope objective.

A further preferred configuration of the objective attachment according to the invention is distinguished in that the first spout and the second spout are connected by a microreservoir for the immersion liquid. This microreservoir makes it possible to have the effect that, directly after the immersion liquid has been applied or introduced into the target region, a wetting extending from the first spout to the second spout forms. The reliability of the extraction by suction of the immersion liquid after use can thus be increased.

Preferably, the microreservoir may be formed by a surface functionalization. For example, the microreservoir may be formed by multiple depressions, in particular grooves.

The grooves that form the microreservoir may extend from the first spout to the second spout. The formation of the wetting of the region between the first spout and the second spout is thus promoted.

In addition or alternatively, a surface of the microreservoir, in the region of the first spout and the second spout, may have an attractive surface functionalization for an immersion liquid used or the microreservoir may be formed by an attractive surface functionalization.

In principle, it is possible for a line to be connected to the distal end of a cannula by means of any desired connection technology, in particular also materially bonded. In preferred variants of the objective attachment according to the invention, however, it is advantageous for an adapter for the releasable connection of the line to be formed at the distal opening of a cannula or of multiple or all cannulas.

The adapter may, for example, comprise a respective screw connection, plug-in connection or bayonet closure.

The objective attachment may in principle be produced from any suitable materials, for example from metal and/or plastic. Preferred configurations are distinguished in that the cannula comprises a plastics part or is a plastics part.

It is also possible for the fastening device to be in the form of a plastics moulding, in particular a one-piece plastics moulding.

In the case of a preferred exemplary embodiment, one of the cannulas or multiple or all cannulas, at least with a part of the fastening device or the entire fastening device, are in the form of a plastics part.

In the case of the arms of the fastening device, it is important for them to at least partially engage around the housing of the microscope objective and to ensure a force-fitting retention, therefore a clamping, of the objective attachment on the housing of the microscope objective. Preferably, the arms are made from an elastic material for that purpose. For example, the arms may have the form of flat and stiff but elastic strips.

The plastics part may be a plastics moulding, which is designed and configured to hold on a housing of a microscope objective in an at least partially form-fitting manner.

Preferably, the arms of the objective attachment may have distal regions, that is to say regions that are remote from the cannula or the cannulas. The distal regions of the arms may in the working state preferably come into contact with the housing of the microscope objective and exert a holding or clamping force on the housing. To that end, the distal regions may have a suitable shaping, for example a flattened, hand-like shape, in order to increase the friction in relation to the housing of the microscope objective. If appropriate, it may also be advantageous, in order to increase the friction in relation to the housing of the microscope objective in the working state, to provide, in the distal regions, for example the regions formed in the manner of a hand, a suitable surface functionalization on the surfaces that come into contact as intended with the housing of the microscope objective. The distal regions may in particular be the distal ends of the arms. However, this is not absolutely necessary.

Particularly preferably, the entire objective attachment may be in the form of a single plastics moulding. For example, such a plastics moulding may be manufactured using a 3D printing technique.

In principle, the invention is implemented when the fastening device is configured to hold the objective attachment on the housing of the microscope objective in a force-fitting manner. To that end, for example, a clamping connection can suffice. As an addition or alternatively, in other preferred variants of the objective attachment according to the invention, a respective part of an at least two-part coupling is present on the arms, the parts of the coupling may in particular be configured to establish a connection to one another, the two arms of the fastening device in the fastening state, that is to say the working state, enclose a housing of a microscope objective and the two arms may be connected to one another via the coupling.

Preferably, in this respect the parts of the coupling may be arranged respectively at the ends of the arms. Preferably, the coupling is lockable. For example, the locking of the coupling may be done in the course of mechanically engaging behind.

The coupling may, for example, work according to the principle of a cable tie. In this respect, a first part of the coupling is a toothed locking tongue and a second part of the coupling is a tie head, in which the locking tongue is held by mechanically engaging behind it.

The coupling may, for example, be formed such that it can be opened with a tool or, preferably, by hand.

The objective attachment according to the invention may be in the form of a disposable article, in particular in the event of production by a 3D printing method.

If, for example, an objective attachment according to the invention that was manufactured in the form of a one-piece plastics moulding by a 3D printing method is no longer required, its material can be reused for a further objective attachment according to the invention, in particular adapted to another housing shape of a microscope objective.

In the case of a disposable article, a coupling may also be formed such that it can be opened only destructively.

In principle, it is possible for the objective attachment according to the invention to be mounted on and/or removed from a housing of a microscope objective with tools, possibly with special tools. In the case of particularly preferred exemplary embodiments of the objective attachment according to the invention, the fastening device is configured such that it can be mounted on and removed from the microscope objective by hand and/or without tools.

It is particularly preferable, for example, if the fastening device is configured such that it can be mounted on and removed from the microscope objective in the manner of a clip. What is meant by this is that the objective attachment is pressed onto the microscope objective, in the process the arms being slightly opened or spread, and then the objective attachment is held on the housing of the microscope objective by the arms in a force-fitting manner and preferably also in a form-fitting manner on the housing, and in particular latches to the housing. For removal purposes, such an objective attachment simply needs to be detached from the microscope objective.

In addition or alternatively, in the case of other exemplary embodiments of the objective attachment according to the invention, the two arms of the fastening device may be movable in relation to one another in a scissors-like manner and a spring which pretensions the two arms of the fastening device in the closed direction may be present.

In principle, the present invention is implemented when at least one cannula is positioned relative to the target region by means of the objective attachment. The functionality of the objective attachment according to the invention is increased in the case of exemplary embodiments in which the fastening device is furthermore configured to position at least one further functional component relative to the target region.

Preferably, to that end the fastening device may comprise at least one holding apparatus for at least one further functional component.

Further functional components may, for example, be measuring sensors. Advantageous measurement variables may, for example, be: Temperature, quantity of immersion liquid that is present, for example thickness of a layer of immersion liquid, illumination intensity. Furthermore, the functional components may also serve to input energy. For example, these may be light sources and/or heat sources.

For expedient handling of the immersion liquids, in the case of the apparatus according to the invention it is preferably possible for an in particular controllable valve, for example a non-return valve, to be present in at least one of the lines, multiple lines or each of the lines. Such valves and/or the devices for pumping the immersion liquids in the lines can preferably be controlled by a control device.

In that case, for convenient and fault-free operation of the apparatus according to the invention, it is preferred when a bubble trap is present in at least one of the lines, multiple lines or each of the lines that serve to feed the immersion liquid. In the case of a type of such a bubble trap that is suitable for aqueous immersion liquids, the aqueous immersion liquid that flows through the bubble trap and is charged with bubbles is pressed through microporous, hydrophobic membranes, whereas the liquid medium is retained in the bubble trap. Because the membrane is based on the hydrophobic functional principle, such bubble traps are, however, suitable only for aqueous immersion liquids.

There are various options for allowing accumulated gas to escape from a bubble trap again. For example, when drying is employed frit material becomes permeable and accumulated air can escape, until the liquid reaches a level in order to remoisten the frits. As an alternative, materials that are permeable only to air can also be used.

Lastly, for convenient handling of the apparatus according to the invention, expediently at least one pump for pumping the immersion liquid may be present in each of the lines.

On account of the very small quantities of immersion liquid that are to be transported, at least one pump can be manually actuable or multiple or all pumps can be manually actuable.

Small volumes of liquid can moreover be transported in a particularly defined manner in the case of configurations of the apparatus according to the invention in which at least one of the pumps is a peristaltic pump or multiple or all pumps are peristaltic pumps.

In principle, the invention is implemented when a single objective attachment according to the invention is present in the case of the apparatus according to the invention. In the case of advantageous configurations of the apparatus according to the invention, however, different objective attachments are present for different microscope objectives. During working operation with the microscope, in that case the suitable objective attachment can conveniently be selected and placed on when the objective is being changed.

Preferably, lastly, it is also possible for multiple different objective attachments for different immersion liquids to be present. In particular, such objective attachments may differ in terms of their surface functionalizations in the region of the spouts.

BRIEF DESCRIPTION OF THE DRAWINGS

Further advantages and features of the present invention are described below in connection with the appended figures, in which.

Components that are the same or act in the same way are characterized by the same reference signs in the figures.

DETAILED DESCRIPTION

Figure 1:
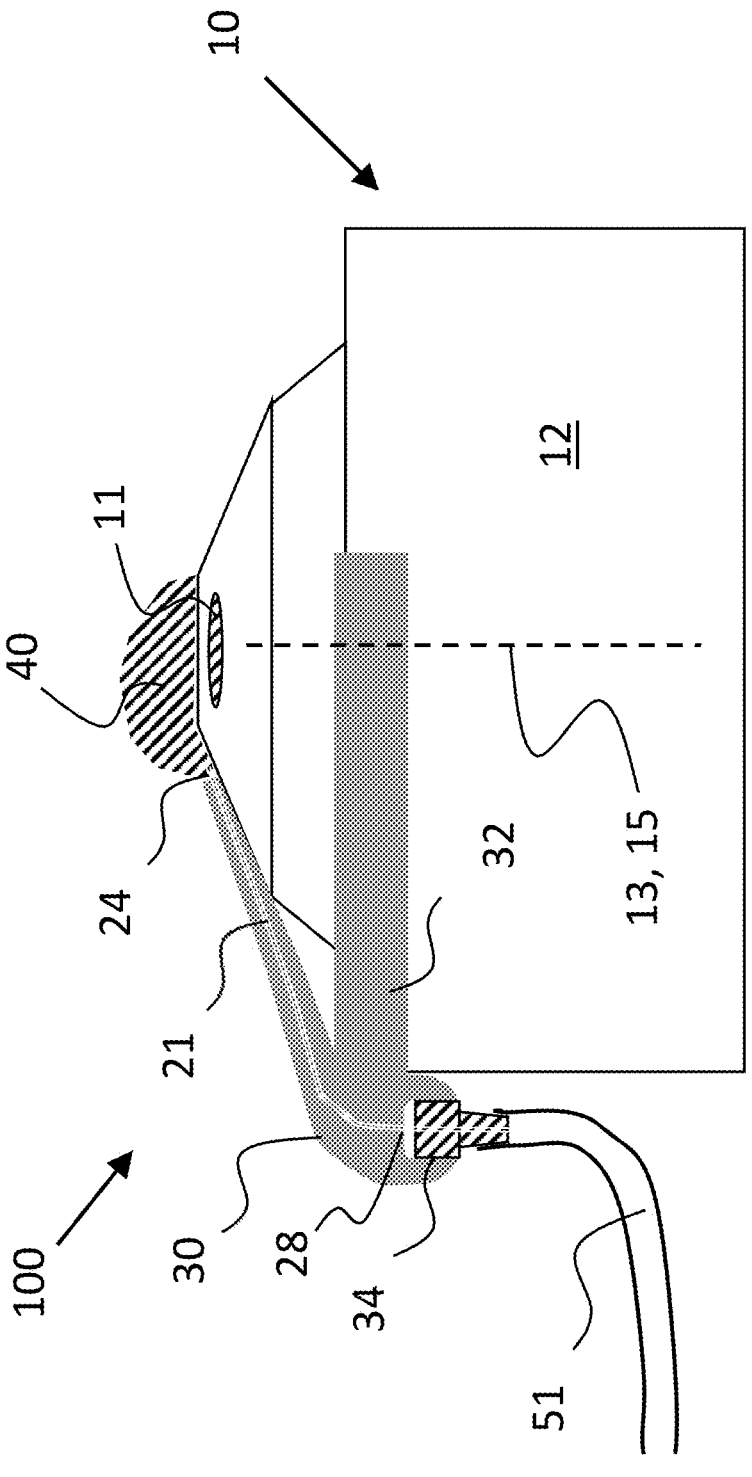
FIG. 1 shows a schematic view of a first exemplary embodiment of an objective attachment according to the invention.
Figure 2:
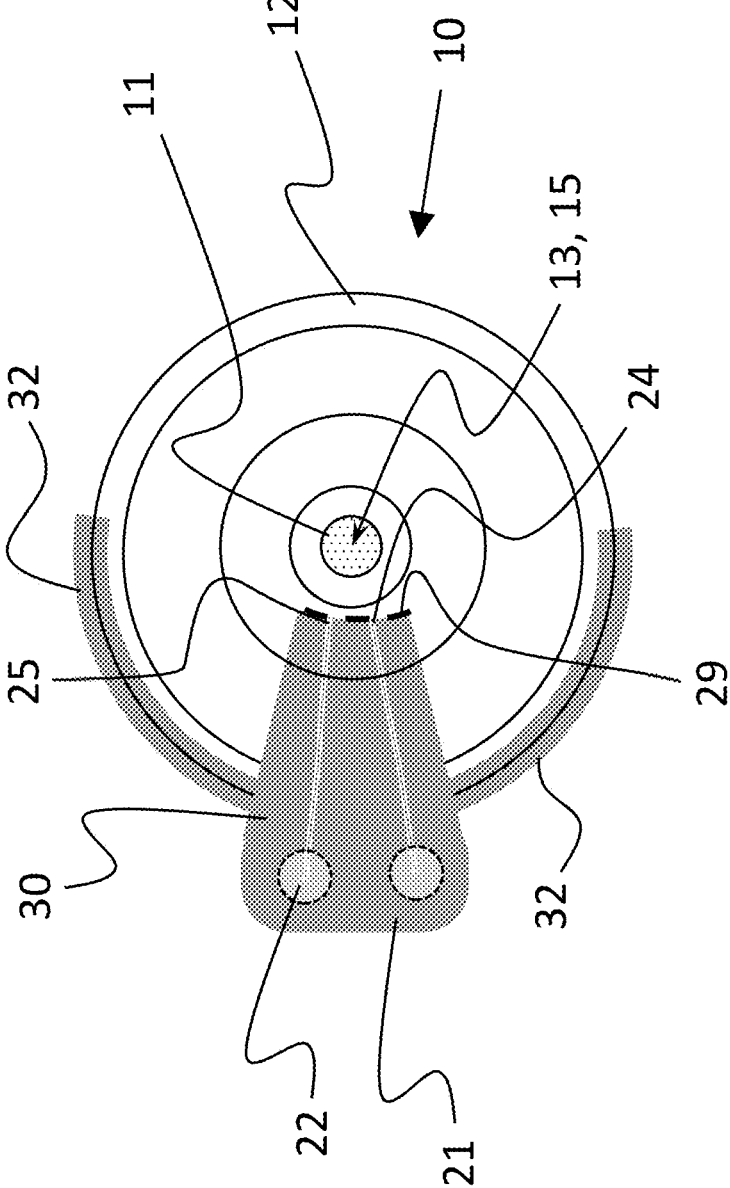
FIG. 2 shows a plan view in the direction of the optical axis of the microscope objective of the objective attachment from FIG. 1.

An exemplary embodiment of an objective attachment 100 according to the invention will be explained with reference to FIGS. 1 and 2. FIG. 1 shows a view from the side, transversely in relation to an optical axis 13 of a microscope objective 10, and FIG. 2 shows a plan view from the perspective of the optical axis 13. In this situation, which can be designated as installed situation or working state, the optical axis 13 of the microscope objective 10 is identical to an axis 15 of the objective attachment 100 according to the invention.

A respective housing 12 of the microscope objective 10 with a target region 11 on its front side, in or on which an immersion liquid 40 is to be brought or from which the immersion liquid 40 is to be transported away, is illustrated schematically.

In the exemplary embodiment shown, the objective attachment 100 according to the invention comprises a plastics moulding having a first cannula 21, a second cannula 22 and a fastening device 30. The second cannula 22 is visible only in FIG. 2. The first cannula comprises a first spout 24, therefore an opening close to the target region 11, and a distal end 28. The second cannula 22 comprises a second spout 25, that is to say a further opening close to the target region 11, and a distal end which is not shown.

According to the invention, the fastening device 30 comprises two arms 32, which in the exemplary embodiment illustrated in FIGS. 1 and 2 partially engage around the housing 12 of the microscope objective 10 and fixedly clamp the objective attachment 100 there, that is to say retain it there in a force-fitting manner.

At the distal end 28, the first cannula 21 comprises an adapter 34, to which a line 51 is connected. A similar adapter and a similar line are present at the distal end of the second cannula 22. In the exemplary embodiment shown, the fastening device 30 with the two arms 32, the first cannula 21 and the second cannula 22 are in the form of a one-piece plastics moulding. This one-piece plastics moulding can be manufactured advantageously using a 3D printing method. The first cannula 21 may serve to introduce the immersion liquid 40 and the second cannula 22 may serve to remove, or extract by suction, the immersion liquid 40, as illustrated schematically in FIG. 1 as a droplet.

A central idea of the invention described here is the application and optionally also the extraction by suction of the immersion liquid 40 at a defined position in the target region 11 of the microscope objective 10, that is to say generally below the front face of the first lens mount. It is essential here that a free working distance upstream of the microscope objective 10 is not restricted, or in any case is restricted only negligibly. The objective attachment 100 according to the invention, using the cannulas 21 and 22, guides the immersion liquid 40 up to the target region 11 on the microscope objective 10 and removes it from there again. In the embodiment illustrated in FIGS. 1 and 2, the objective attachment 100 can be pushed onto the microscope objective 10 without tools. This is achieved by way of the specifically formed fastening device 30, the arms 32 of which rest right up against the upper region of the housing 12 of the microscope objective 10. Positioning can thus be achieved quickly and with high accuracy, for example better than 2/10 mm, and moreover also reversibly. By contrast to known approaches from the prior art, the fastening device engages around the housing only partially and can therefore be pushed on from the side.

As can be seen from FIG. 2, an end piece of the first cannula that connects to the first spout and an end piece of the second cannula that connects to the second spout are arranged with an opening angle of less than 45° in relation to the axis 15 of the objective attachment 100 in an angular segment of the azimuth angle. The azimuth angle in this respect is the angle encircling the axis 15. The end piece of the first cannula 21 that connects to the first spout 24 and the end piece of the second cannula 22 that connects to the second spout 25 lie on the lateral surface of a cone, the axis of which coincides with the axis 15 of the objective attachment 100.

The objective attachment 100 according to the invention that is described here may be made comparatively thin, for example smaller than 1 mm, in the region of the target region 11 by way of its outlet and receiving openings for the immersion liquid 40, that is to say the cannulas 21 and 22 with the spouts 24 and 25. In this way, only a small part of the front region 11 of the microscope objective 10 is slightly modified and in particular the aim of substantially not restricting the ability to reach the sample can thus be attained.

A further important aspect, in the case of the embodiment of FIGS. 1 and 2, is moreover that a front region of the plastics moulding, at which the spout 24 of the first cannula 21 and the spout 25 of the second cannula 22 open out, is provided with a microreservoir 29. The first spout 24 and the second spout 25 are connected by the microreservoir 29 for the immersion liquid 40. This microreservoir 29 facilitates the introduction and extraction by suction of the immersion liquid 40 and can contribute to the immersion liquid 40 not flowing past or under the side of the plastics moulding. The microreservoir 29 may be in the form of a surface functionalization, for example a plurality of grooves, which can be wetted by the immersion liquid 40.

The microreservoir 29 is similarly advantageous for feeding and for removing the immersion liquid 40. In this way, virtually complete removal of an immersion liquid 40 from the target region 11 can be achieved, because the connection of a droplet of immersion liquid 40, coming from the spout 24, to the spout 25 of the second cannula 22, that is to say the suction-extraction channel, is ensured already upon application of the immersion liquid 40. If, in the case of this approach, the release of immersion liquid 40 and the extraction or intake by suction is possible comparatively close to the front lens of the microscope objective 10, the required amount of immersion liquid 40 is very small. The dominating forces are therefore determined by the surface tension and by the interaction of the immersion liquid 40 used with the respective interfaces, in particular in the region of the spouts 24, 25 and the microreservoir 29. Therefore, the objective attachment described here is equally suitable for both upright and inverted or other alignments of the microscope objective 10.

In the case of an inverted microscope, it can be necessary for a surface of the objective attachment to have a sufficiently large contact angle close to the target region, with the result that the immersion liquid does not flow away downwards, but rather, as it exits the spout 24, forms a droplet which, when it is large enough, reaches and covers the target region 11 on the microscope objective 10. The presence of a sample or a substrate is not absolutely necessary in order to achieve wetting of the target region 11. The robustness of the objective attachment according to the invention is thus increased and the dependency on boundary conditions that must be observed during the introduction and removal of the immersion liquid is reduced.

Figure 3:
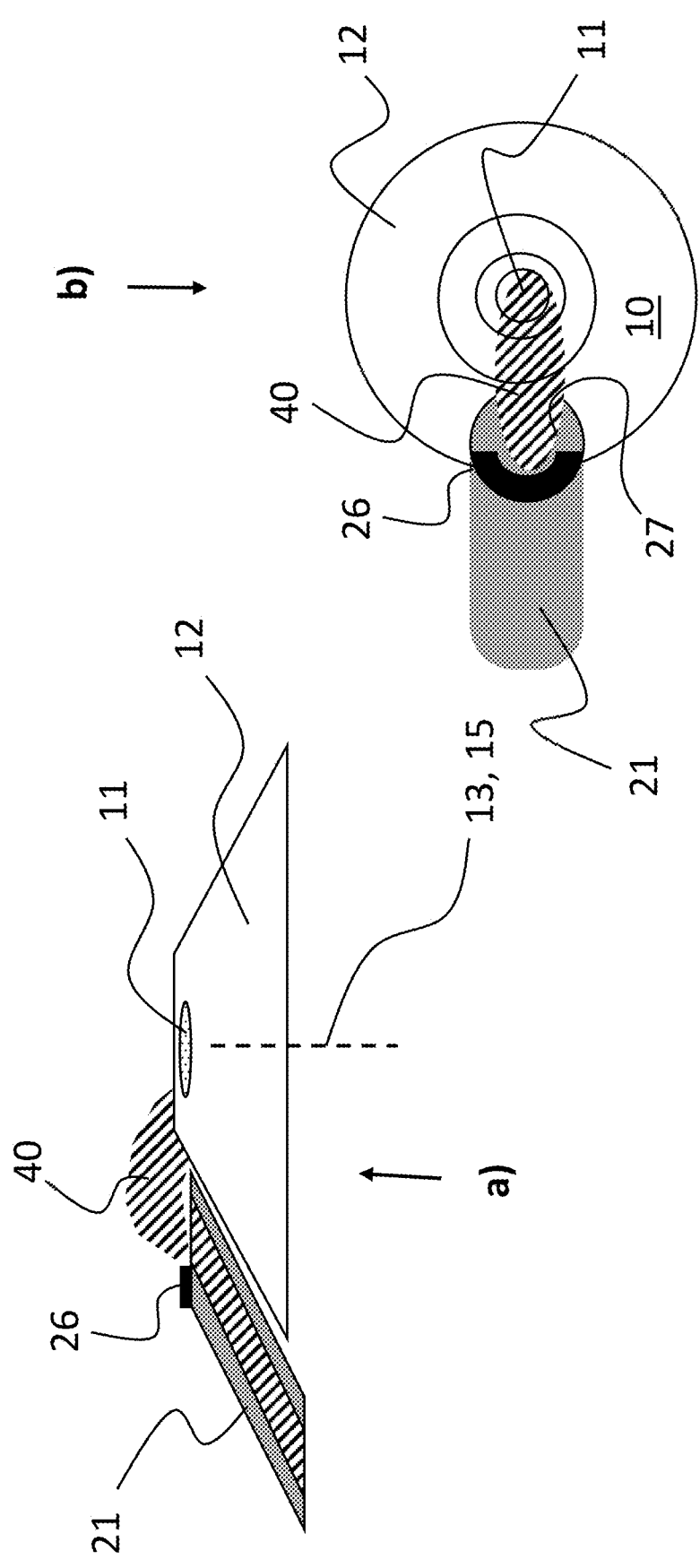
FIG. 3 shows schematic views of a second exemplary embodiment of the objective attachment according to the invention.

A second exemplary embodiment of a spout 27 for an objective attachment according to the invention is illustrated in FIG. 3. The contour of the spout 27 has a concave contour as viewed from the direction of the optical axis 13 (partial FIG. 3b)). Moreover, a partial region 26 on the spout 27 is provided with a surface functionalization, such that this region 26 is not wetted by the immersion liquid 40. The concave contour and the region 26 contribute to the immersion liquid 40 moving in the direction of the target region 11.

When a cannula of the type shown in FIG. 3 is used to transport away or extract by suction the immersion liquid 40, the region 26 advantageously leads to the immersion liquid 40 being conducted better into the interior of the cannula. Here, too, it is possible, although this is not illustrated in FIG. 3, for a respective cannula to be present for the feeding and the extraction by suction of the immersion liquid 40, the spouts of said cannulas also being able to be connected to a microreservoir.

Figure 4:
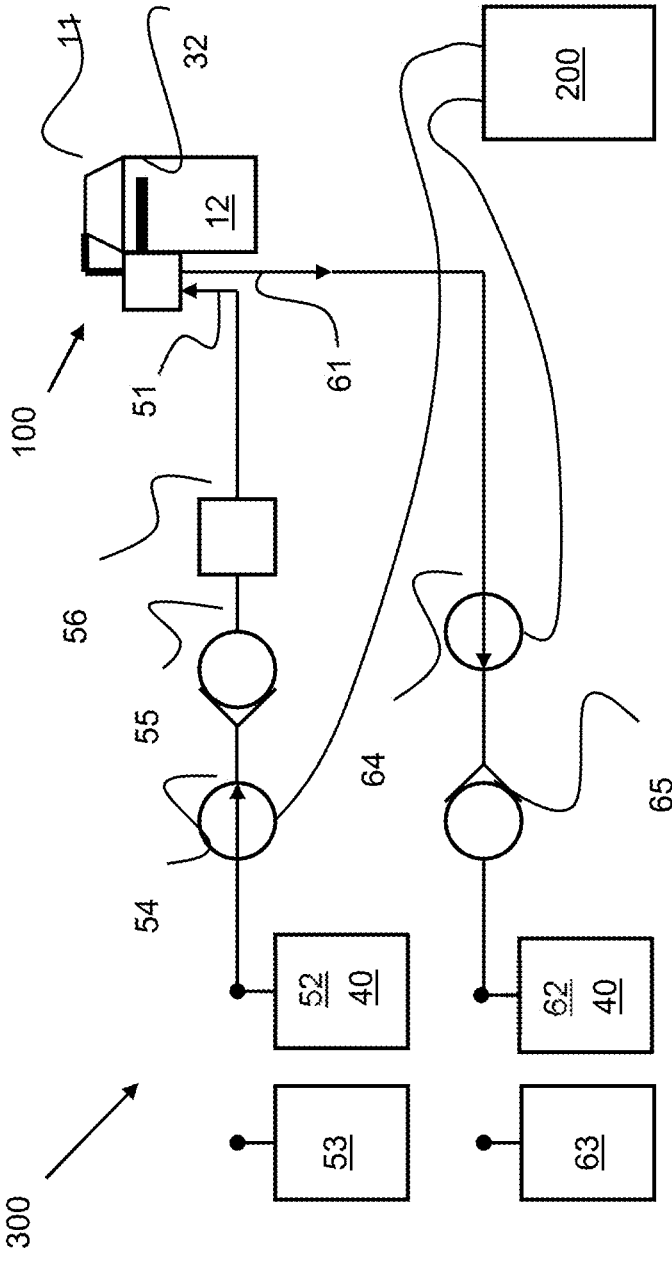
FIG. 4 shows a schematic view of an apparatus according to the invention.

FIG. 4 shows an exemplary embodiment of an apparatus 300 according to the invention with a schematically illustrated objective attachment 100 according to the invention, for example of the type shown in FIGS. 1 and 2. The objective attachment 100 in FIG. 4 is arranged in a working position on a housing 12 of a microscope objective 10. A first line 51 and a second line 61 are connected to the objective attachment 100 according to the invention. The first line 51 serves to feed the immersion liquid 40 into the target region and the second line 61 serves to transport the immersion liquid 40 away from the target region 11. To store the immersion liquid 40, a first storage container 52 connected to the objective attachment 100 by way of the line 51 is present. A first pump 54 serves to transport the immersion liquid 40 in the first line 51. In order to prevent a backflow of immersion liquid 40 in the line 51, a non-return valve 55 is present downstream of the pump 54. Lastly, to remove bubbles in the immersion liquid 40, a bubble filter 56 is present downstream of the one non-return valve 55.

A second pump 64 serves to pump the immersion liquid 40 in the second line 61. Moreover, in order to prevent backflow of the immersion liquid 40 in the direction of the objective attachment 100 and thus into the target region 11, a non-return valve 65 is present downstream of the pump 64. The second line 61 lastly leads into a first disposal container 62, in which used immersion liquid 40 can be collected. In the exemplary embodiment shown, the pumps 54 and 64 are actuated by a control device 200, which may be, for example, a conventional PC. The valves 65 and 55 can likewise be controllable and in that case, this not being shown in FIG. 4, can likewise be controlled by the control device 200. To work with a further immersion liquid, a further storage container 53 and a further disposal container 63 are present, which optionally can be connected to the objective attachment 100 via the lines 51 and 61.

The invention described here proposes an objective attachment for microscope objectives for introducing immersion liquid, which objective attachment is suitable for different objective geometries and different alignments of the microscope objective. The approach according to the invention makes it possible to implement both the application and the extraction by suction of immersion liquid.

The objective attachment according to the invention requires only small structural modifications in the region of the microscope objective and substantially does not restrict the reachability of the microscope objective for a sample.

Only very small quantities of the immersion liquid respectively used are necessary. Because the use of the often expensive immersion liquids is accordingly low, it is also the case that only comparatively small storage containers are necessary to ensure sufficiently long service lives.

Because the required quantities of immersion liquid are small, only very low flow rates are required to bring the immersion liquid to the target region or extract it therefrom by suction quickly enough. It is also possible to introduce and extract by suction highly viscous immersion liquids. Because only low flow rates are necessary, the risk of bubble formation or the release of bubbles is also comparatively small. Preferred configurations of the objective attachment according to the invention can be placed onto the microscope objective reversibly and without tools. The handling for a user in the case of an objective attachment that can be clipped on is particularly straightforward. The handling can in particular be configured such that no further positioning is possible, and in this respect no adjustment is necessary, either.

The objective attachment according to the invention enables exact positioning of functional elements, first and foremost of the outlet and inlet for the immersion liquid used but in principle also of other functional components, such as sensors. The objective attachment according to the invention is suitable in particular for production by additive production methods (3D printing methods), so that, for different objective models and/or different immersion liquids, respective different objective attachments can be manufactured without problems.

LIST OF REFERENCE SIGNS

10 Microscope objective
11 Target region on the front side of the microscope objective 10
12 Housing of the microscope objective 10
13 Optical axis of the microscope objective 10
15 Axis of the objective attachment 100 according to the invention
21 Cannula, first cannula
22 Second cannula
24 First spout, spout of the first cannula 21
25 Second spout, spout of the second cannula 22
26 Subregion on spout 27 with repulsive surface functionalization
27 Spout
28 Distal opening of the cannula 21
29 Microreservoir, e.g. grooves
30 Fastening device, plastics moulding
32 Arms of the fastening device 30
34 Adapter, connection for line 51, 61
40 Immersion liquid
51 First line
52 First storage container for immersion liquid 40
53 Second storage container for immersion liquid
54 Pump
55 Non-return valve
56 Bubble trap
61 Second line
62 First disposal container for used immersion liquid 40
63 Second disposal container for used immersion liquid
64 Pump
65 Non-return valve
100 Objective attachment according to the invention
200 Control device
300 Apparatus according to the invention

What is claimed is:

1. Objective attachment for a microscope objective for transporting an immersion liquid between a target region on a front side of the microscope objective and an immersion liquid transport line, the objective attachment comprising:
   at least one cannula having a spout for dispensing and/or receiving the immersion liquid and having a distal opening, to which the transport line for the immersion liquid can be connected,
   wherein a first cannula is present which has a first spout for dispensing the immersion liquid into the target region and has a first distal end, to which a first transport line for the immersion liquid can be connected, and wherein a second cannula is present which has a second spout for receiving the immersion liquid from the target region and has a second distal end, to which a second transport line for the immersion liquid can be connected, and a fastening device for holding the cannula on a housing of the microscope objective and for positioning the spout relative to the target region, wherein the fastening device comprises at least two arms, which are configured to at least partially laterally engage around the housing of the microscope objective and to hold on the housing in a force- fitting manner.

2. Objective attachment according to claim 1, wherein each of the first transport line and the second transport line comprises a tube or a pipe.

3. Objective attachment according to claim 1, wherein the opening of a spout or of multiple or all spouts in cross section has the shape of a flat rectangle or the shape of a flat ellipse.

4. Objective attachment according to claim 3, wherein the long side of the rectangle or direction of the semi-major axis of the ellipse is oriented transversely in relation to an axis of the objective attachment.

5. Objective attachment according to claim 1, wherein the opening of a spout or of multiple or all spouts at least partially engages around the target region.

6. Objective attachment according to claim 1, wherein at least parts of the surface of at least one of the spouts or of multiple or all spouts have an attractive or repulsive surface functionalization with regard to certain types of immersion liquids.

7. Objective attachment according to claim 6, wherein the surface functionalization confers hydrophobic, hydrophilic, lipophilic or lipophobic properties on the respective parts of the surface.

8. Objective attachment according to claim 6, wherein those parts of the surface of the spout or of the spouts that have a surface functionalization have a microstructuring, a coating and/or chemically treated surface regions or are made from a material with a desired surface functionalization.

9. Objective attachment according to claim 1, wherein the cannula in the region of the spout is manufactured from different materials.

10. Objective attachment according to claim 1, wherein an end piece of the first cannula that connects to the first spout and an end piece of the second cannula that connects to the second spout are arranged on the lateral surface of a cone, the axis of which coincides with the axis of the objective attachment.

11. Objective attachment according to claim 1, wherein an end piece of the first cannula that connects to the first spout and an end piece of the second cannula that connects to the second spout are arranged with an opening angle of less than 180° in relation to the axis of the objective attachment in an angular segment of the azimuth angle.

12. Objective attachment according to claim 1, wherein the first spout and the second spout are connected by a microreservoir for the immersion liquid.

13. Objective attachment according to claim 12, wherein the microreservoir is formed by a surface functionalization.

14. Objective attachment according to claim 13, wherein the surface functionalization that form the microreservoir extend from the first spout to the second spout.

15. Objective attachment according to claim 1, wherein a surface of the microreservoir, in the region of the first spout and the second spout, has an attractive surface functionalization for the immersion liquid used or wherein the microreservoir is formed by an attractive surface functionalization.

16. Objective attachment according to claim 1, wherein a respective adapter for releasably connecting the transport line is formed at the distal opening of a cannula or of multiple or all cannulas.

17. Objective attachment according to claim 1, wherein the cannula comprises a plastics part.

18. Objective attachment according to claim 1, wherein the fastening device is formed in one piece as a plastics moulding.

19. Objective attachment according to claim 1, wherein one of the cannulas or multiple or all cannulas, at least with a part of the fastening device or the entire fastening device, are in the form of a plastics part.

20. Objective attachment according to claim 19, wherein the plastics part is a plastics moulding, which is designed and configured to hold on a housing of a microscope objective in an at least partially form-fitting manner.

21. Objective attachment according to claim 1, wherein a respective part of an at least two-part coupling is present on the arms, wherein the parts of the coupling are configured to establish a connection to one another and wherein the two arms of the fastening device in the fastening state enclose a housing of a microscope objective and the arms are connected to one another via the coupling.

22. Objective attachment according to claim 1, which is a disposable article.

23. Objective attachment according to claim 1, wherein the fastening device can be mounted on and removed from the microscope objective by hand and/or without tools.

24. Objective attachment according to claim 1, wherein the fastening device can be mounted on and removed from the microscope objective in the manner of a clip.

25. Objective attachment according to claim 1, wherein the fastening device is configured to position at least one further functional component relative to the target region.

26. Objective attachment according to claim 1, wherein the fastening device comprises at least one holding apparatus for at least one further functional component.

27. Apparatus for feeding immersion liquid to a target region on a front region of a microscope objective and/or for removing immersion liquid from the target region, the apparatus comprising:

at one objective attachment for the microscope objective for transporting the immersion liquid between the target region on a front side of the microscope objective and an immersion liquid transport line, the objective attachment comprising:

at least one cannula having a spout for dispensing and/or receiving the immersion liquid and having a distal opening, to which the transport line for the immersion liquid can be connected, and a fastening device for holding the cannula on a housing of the microscope objective and for positioning the spout relative to the target region, wherein the fastening device comprises at least two arms, which are configured to at least partially laterally engage around the housing of the microscope objective and to hold on the housing in a force-fitting manner, a storage container for the immersion liquid, the immersion liquid transport line, which connects the storage container to the distal opening of the cannula of the objective attachment, and a pump for pumping the immersion liquid in the immersion liquid transport line.

28. Apparatus according to claim 27, wherein the objective attachment comprises a first cannula for feeding the immersion liquid and a second cannula for removing the immersion liquid, wherein the storage container is connected to the first cannula by way of a first transport line and wherein a disposal container connected to the second cannula by way of a second transport line is present.

29. Apparatus according to claim 27, wherein multiple storage containers and/or multiple disposal containers for different immersion liquids are present.

30. Apparatus according to claim 27, wherein a valve is present in at least one of the transport lines, multiple transport lines or each of the transport lines.

31. Apparatus according to claim 27, wherein a bubble trap is present in at least one of the transport lines, multiple transport lines or each of the transport lines that serve to feed the immersion liquid.

32. Apparatus according to claim 27, wherein at least one pump for pumping the immersion liquid is present in each of the transport lines.

33. Apparatus according to claim 27, wherein multiple different objective attachments, each of which is designed for different housing shapes of microscope objectives, are present.

34. Apparatus according to claim 27, wherein multiple different objective attachments for different immersion liquids are present.

35. Apparatus according to claim 27, wherein the opening of a spout or of multiple or all spouts in cross section has the shape of a flat rectangle or the shape of a flat ellipse.

\* \* \* \* \*